United States Patent
Dujmic et al.

(10) Patent No.: US 11,535,024 B2
(45) Date of Patent: Dec. 27, 2022

(54) COMPONENT PART COMPRISING WEAR INDICATOR

(71) Applicant: manroland Goss web systems GmbH, Augsburg (DE)

(72) Inventors: Zeljko Dujmic, Augsburg (DE); Jan-Hendrik Groth, Augsburg (DE); Marco Wiedemann, Affing (DE); Andreas Schwoepfinger, New South Wales (AU)

(73) Assignee: manroland Goss web systems GmbH, Augsburg (DE)

( * ) Notice: Subject to any disclaimer, the term of this patent is extended or adjusted under 35 U.S.C. 154(b) by 59 days.

(21) Appl. No.: 17/185,285

(22) Filed: Feb. 25, 2021

(65) Prior Publication Data

US 2021/0260866 A1    Aug. 26, 2021

(30) Foreign Application Priority Data

Feb. 25, 2020    (DE) ..................... 10 2020 104 909.9

(51) Int. Cl.
*B33Y 80/00* (2015.01)
*B41F 13/00* (2006.01)

(52) U.S. Cl.
CPC ............. *B41F 13/00* (2013.01); *B33Y 80/00* (2014.12)

(58) Field of Classification Search
CPC .......... B41F 13/00; B41F 33/00; B33Y 80/00; B65H 2404/561; B65H 2701/1131; B65H 2601/61; B65H 2553/20; B65H 2220/01; B65H 2220/11; B65H 29/68; B65H 9/14; B65H 2601/522; B65H 2404/53
See application file for complete search history.

(56) References Cited

U.S. PATENT DOCUMENTS

| 2003/0160156 A1 | 8/2003 | Duhamel |
| 2006/0033018 A1 | 2/2006 | Duhamel |

FOREIGN PATENT DOCUMENTS

| DE | 195 43 963 C1 | 4/1997 | |
| DE | 10 2008 040 600 A1 | 1/2010 | |
| DE | 102008040600 A1 * | 1/2010 | ............. B65H 27/00 |
| DE | 20 2016 101 668 U1 | 4/2016 | |

(Continued)

OTHER PUBLICATIONS

DE-102008040600-A1 English translation (Year: 2010).*

(Continued)

*Primary Examiner* — Jason L Vaughan
*Assistant Examiner* — Amanda Kreiling
(74) *Attorney, Agent, or Firm* — Christopher C. Dremann, P.C.; Christopher C. Dremann

(57) ABSTRACT

A component part for use in printing presses or paper- and substrate-processing machines, wherein the component part has at least one first region made of a first material with first physical properties, and wherein the at least one first region has a functional surface, which is in contact with a web- or sheet-shaped substrate and which is subject to wear. The component part provides a solution, by means of which the reaching of degrees of wear or also of wear limits can be easily determined without using aids. The component part is configured such that adjacent to and/or spaced apart from the at least one functional surface, at least one second region is at least partially enclosed by the first region.

16 Claims, 2 Drawing Sheets

(56) References Cited

FOREIGN PATENT DOCUMENTS

| DE | 202016101668 U1 * | 5/2016 |
|---|---|---|
| DE | 20 2016 06 362 U1 | 12/2016 |
| DE | 10 2016 117 238 A1 | 3/2018 |
| EP | 1 338 539 A2 | 8/2003 |
| EP | 3 222 568 B1 | 9/2017 |

OTHER PUBLICATIONS

DE-202016101668-U1 English translation (Year: 2016).*
Deutsches Patent—Und Markenamt [German Patent Office (GPO)], Recherchebericht [Search Report], Oct. 7, 2020 [Oct. 7, 2020], 8 Pages, Munchen, Germany (DE).
Europäisches Patentamt [European Patent Office], Europäischer Recherchenbericht, May 26, 2021 (May 26, 2021), 10 pages, München, Deutschland [Munich, Germany] (DE).

* cited by examiner view X view X view X

COMPONENT PART COMPRISING WEAR INDICATOR

FIELD OF THE INVENTION

The invention relates to a component part for use in printing presses or paper- and substrate-processing machines, wherein the component part comprises at least one first region made of a first material with first physical properties, and wherein the at least one first region comprises a functional surface, which is in contact with a web- or sheet-shaped substrate and which is subject to wear.

Background of the Invention and Related Art

In the case of printing presses or in the case of paper- or substrate-processing machines, such as, for example in the case of folding units, which are integrated in printing presses, folding apparatuses, feeders, staplers, or other apparatuses, which operate separately from printing presses and which process web- or sheet-shaped substrate in folded or unfolded form, certain component parts come into contact with the substrate to be processed, such as, for example, paper, in such a way that a relative movement takes place between at least one functional surface of a component part and the substrate. Functional surfaces of this type are subject to wear, because the at least one functional surface is removed over a more or less long period of time due to the relative movement between the functional surface and the substrate moving thereon. Even though relatively wear-resistant coatings are known from the prior art, they are also susceptible with respect to the depositing of color or result in high production costs.

In the case of correspondingly strong wear of functional surfaces, the geometry changes in the region of the functional surface of the component part, so that either the functionality of the component part and thus of the entire component is no longer ensured in its entirety, or the wall thicknesses and cross sections decrease due to corresponding wear, so that strongly worn parts can also break.

On the one hand, a plurality of wear-resistant or wear-inhibiting coatings are known from the prior art, but which, due to the high relative speeds of up to 20 meters per seconds in particular in the case of highly abrasive substrates, only delay the wear in most cases. As soon as a wear-inhibiting coating of this type is at least partially worn, the material, which is relatively soft compared to the coating, wears just as quickly. The operator of the service personnel can thus not determine when a degree of wear is reached, starting at which the functionality, the performance, or the operational safety is impacted according to experience.

A brake brush with brush fittings is known from EP 3 222 568 B1, in the case of which the brush body has, at least partially, at least one overhang, which protrudes beyond the fitting surface at an overhang height in extension of the fitting thickness, in order to indicate the wear of the brush fittings. When the overhang begins to wear, the operator or the service personnel recognizes that brushes with correspondingly worn brush fittings need to be replaced to ensure an unlimited functionality.

Due to the risk of damages for the substrate, overhangs of this type, however, are generally completely unsuitable at functional surfaces without brush fittings, which are in contact with substrates.

OBJECT AND SUMMARY OF THE INVENTION

The invention is thus based on the object of creating a solution, by means of which the reaching of degrees of wear or also of wear limits, can be easily determined without using aids.

The object is achieved by means of a component part according to the invention. The component part according to the invention is characterized in that, adjacent to and/or spaced apart from the at least one functional surface, at least one second region is at least partially enclosed by the first region.

An embodiment of this type has the advantage that, without using additional means, it is recognizable whether the functional surface of a component part has reached a critical level of wear. It is further also possible to display information relating to different levels of wear to the operator, so that corresponding replacement parts can be procured in a timely manner.

By using new manufacturing processes, such as in particular the process known as additive manufacturing or 3D printing, it is possible in particular to produce component parts of this type quickly, cost-efficiently, and, in the case of the introduction of material into the second region, without weakening the mechanical strength properties. However, component parts according to the invention are not necessarily limited to an additive production process, but various designs of a component part of this type are undoubtedly ideal for the 3D printing process due to the general homogeneity of the mechanical properties.

In one embodiment of the invention, the at least one second region at least partially forms a part of the functional surface in the case of wear of at least one functional surface.

An embodiment of this type has the advantage that both the at least one functional surface remains continuous even in the case of wear and that the component part can thus be embodied as solid, continuous body according to the design specifications.

According to a further embodiment, the second region in the case of a component part of this type consists of a material with second physical properties, which at least partially differ from the first physical properties of the first material of the first region. These physical properties of the second material, which are changed compared to the first material, can be, for example, optical properties or the reflection behavior. The second region, which is exposed due to wear of a functional surface, can thus, for example have a different color than the functional surface, whereby the exposure of the second region is recognizable by means of visual inspection.

According to a further embodiment of the invention, the second region is designed as hollow space. In the case of corresponding wear of a functional surface, the second region is thus exposed. Due to the fact that small hollow spaces of this type do not yet cause any problems on the functional surface, it is likewise recognizable by means of visual inspection, whether a corresponding level of wear has occurred.

Preferred further developments of the invention follow from the following description of exemplary embodiments. Various exemplary embodiments of the invention are described in more detail on the basis of the accompanying drawing figures, without being limited thereto.

DESCRIPTION OF THE DRAWING FIGURES

DESCRIPTION OF EXEMPLARY EMBODIMENTS OF THE INVENTION

Figure 1:
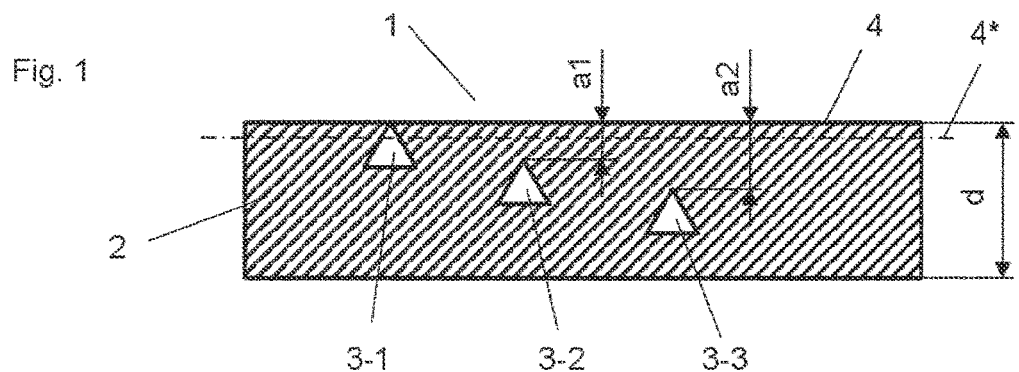
FIG. 1 shows an exemplary embodiment of a component part according to the invention comprising an exemplary functional surface and a plurality of second regions.

FIG. 1 shows an exemplary component part 1, which comprise a first region 2 and a functional surface 4 as an example. It is pointed out in general at this point that all FIGS. 1 to 5 illustrate corresponding components parts 1, which are used at printing presses or at paper- or substrate-processing machines, only purely schematically. For the most part, component parts 1 of this type, which are used in practice, have complex geometries comprising not only one flat functional surface 4. For reasons of a simpler and more comprehensible illustration, the component parts 1 illustrated in FIGS. 1 to 5 furthermore only show a single functional surface 4, even though the present invention generally also comprises parts comprising a plurality of functional surfaces 4.

The component part 1, which is illustrated symbolically in FIG. 1, is only illustrated with a first region 2, which is formed of a first material and which forms the functional surface 4, which is in contact with a non-illustrated substrate. Even though none of FIGS. 1 to 5 illustrate a component part 1 that comprises an additional third region, for example a third region, which is formed for the accommodation or assembly of the first region 2, and which is made of a third material and to which the first region 2 is connected, the present invention also is embodied by component parts 1, in the case of which for example the first region 2 is made of a first material, such as, for example, plastic, and which are connected to a non-illustrated third region made of a third material, such as, for example, steel or aluminum, for fastening in the substrate-processing machine.

The component part 1, which is illustrated as an example in FIG. 1, comprises a first region 2, which is made of a first material. The first region 2 comprises at least one functional surface 4, which is in contact with a web- or sheet-shaped substrate and which is subject to wear due to its contact with the substrate to be processed.

FIG. 1 is a sectional illustration of the component part 1, which comprises a sectional plane arranged perpendicular to the functional surface 4, and which thus provides visibility into the component part 1 according to the invention.

As can be gathered from this sectional illustration of the component part 1, which is illustrated in FIG. 1, the first region 2 comprises a plurality of second regions 3, which are at least partially enclosed by the first region 2 and which are arranged adjacent to and/or spaced apart from the at least one functional surface 4.

The first region 2 thus comprises a first second region 3-1, which essentially directly adjoins the functional surface 4 or which is only very slightly spaced apart from the functional surface 4. The first region 2 further comprises a second second region 3-2, which is spaced apart with the distance a1 from the functional surface 4 slightly further than the first second region 3-1, and a third second region 3-3, which is spaced apart with the distance a2 from the functional surface 4 slightly further than the second second region 3-2. As can be seen from the sectional illustration through the component part 1, the first, second and third second regions 3-1, 3-2, and 3-3 are at least partially enclosed by the first region 2.

The component part 1 according to the invention, which is illustrated in FIG. 1, thus comprises a first region 2 and a plurality of second regions 3, wherein at least two second regions 3 have a different distance a from the functional surface 4.

Although an embodiment with three second regions 3-1, 3-2, 3-3 is illustrated in FIG. 1 as an example, the present invention is possible with any number of second regions 3, for example also only with one second region 3.

If the functional surface 4 wears, the component part thickness d decreases, and the functional surface 4*, which thus deviates from the original position, at least partially intersects a second region 3. In the exemplary illustration according to FIG. 1, the functional surface 4* created by the wear initially intersects the first second region 3-1.

In the case of corresponding wear of the at least one or of at least one functional surface 4, at least one second region 3, in the present example of FIG. 1 this is initially the first second region 3-1, thus at least partially forms a part of the functional surface 4 or 4*, respectively, which is shifted in its position.

The same also occurs when the functional surface 4, which is illustrated in FIG. 1, does not wear evenly, but wears more strongly, for example, in the left region of the functional surface 4 illustrated in FIG. 1, than in the remaining region. In this case, the first second region 3-1, as first one of the second regions 3, also becomes part of the functional surface 4 or 4*, respectively.

In a first embodiment variation, the at least one second region 3 consists of a second material with second physical properties. This second material of the second region 3 differs in at least one property from the first material, of which the first region 2 is made.

In one embodiment of the invention, the second material of the at least one second region 3 has second physical properties, which differ from the first physical properties of the first material of the first region 2 in that the second material has other optical properties and/or a different reflection behavior. This means, for example, that due to the reflection of other wavelength ranges of the visible light, the at least one second region 3 has a different color than the material of the first region 2.

Using the example of the embodiment illustrated in FIG. 1, it is also possible that not all second regions 3-1, 3-2, 3-3 have the same color and thus the same optical properties, but that at least one of the second regions 3-1, 3-2, 3-3 has a color, which differs from the remaining second regions 3-1, 3-2, 3-3, or that each of the plurality of the second regions 3-1, 3-2, 3-3 has a different color.

Based on the color of the exposed second region 3, the level of wear of the functional surface 4 of the component part 1 is thus recognizable during the review.

Using the example illustrated in FIG. 1, for example the first second region 3-1 could thus be made of a material, which is colored white, so that a first wear of the functional surface 4, which is formed by the material of the first region 2, which is colored black, for example, is recognizable after a corresponding operating time.

If the second second region 3-2 is colored yellow, for example, an advancing wear can thus be determined when the second second region 3-2, which is colored yellow, becomes visible, although at this stage, for example, the functionality of the component part 1 is still guaranteed in its entirety. However, the exposure of the second second region 3-2, which is colored yellow, can be associated with the suggestion to stock a corresponding component part 1 or to review the inventory.

If the third second region 3-3 is colored red, for example, highly advanced wear can be determined when the third second region 3-3, which is colored red, becomes visible, in the case of which for example the functionality of the component part 1 is only still guaranteed for a limited amount of time and/or only to a limited extent. The exposure of the third second region 3-3, which is colored red, can thus be associated with the suggestion to replace a corresponding component part 1 or to at least review the functionality, and/or to plan for a replacement of the component part 1 at least within a certain time period.

In a second embodiment variation, the at least one second region 3 is designed as a hollow space.

In particular by means of additive production processes, also referred to as 3D printing, it is possible due to the process to also produce hollow spaces of this type with small dimensions and with an exactly defined geometric shape and arrangement to the functional surface 4, even if the second region 3, which is formed as hollow space, is completely enclosed by the first region 2.

A second region 3 of this type, which is designed as hollow space, can be enclosed completely in the first region 2, as illustrated, for example, in FIG. 1.

Although not illustrated in FIG. 1, it is also possible in the case of a plurality of second regions 3 to design at least one second region 3, for example the first second region 3-1, as hollow space, and to design at least one further second region 3, for example the second second region 3-2 and the third second region 3-3 with one or several second materials, which differs from the first material of the first region 2, or with several different second materials.

Figure 3A:
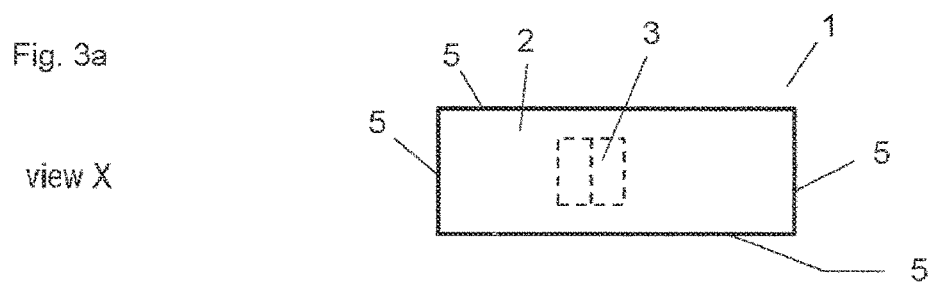
FIG. 3a shows a top view of the component part shown in FIG. 2 in a first embodiment.

Although only a sectional illustration of the component part 1 is illustrated in FIG. 1, at least one second region 3 or the one second region 3 can be completely enclosed by the first region 2 according to the illustration in FIG. 3a.

Figure 3B:
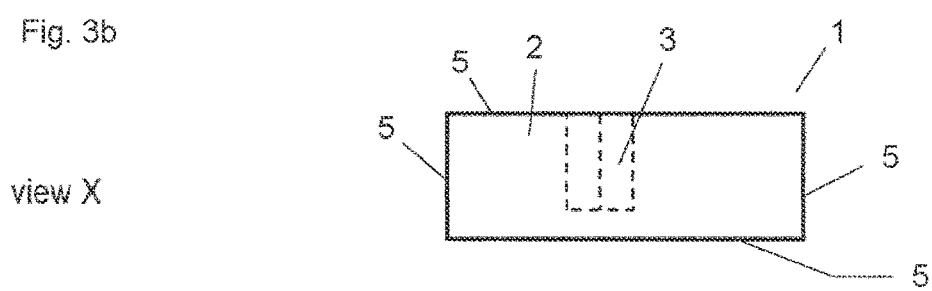
FIG. 3b shows a top view of the component part shown in FIG. 2 in a second embodiment.

It is also possible that at least one second region 3 or the one second region 3 reaches to at least one boundary surface 5 according to the illustration in FIG. 3b.

Figure 3C:
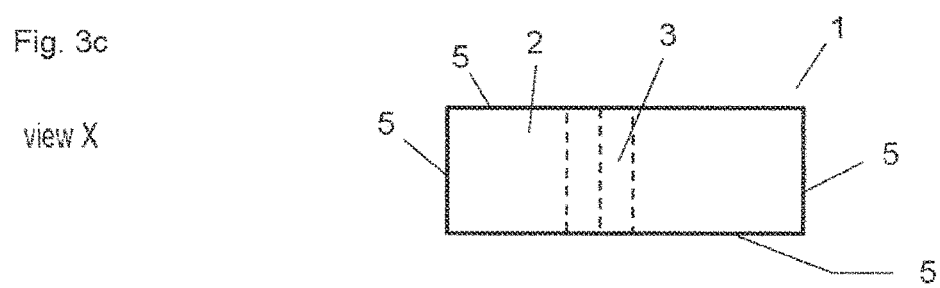
FIG. 3c shows a top view of the component part shown in FIG. 2 in a third embodiment.

It is further possible that at least one second region 3 or the one second region 3 reaches from a first outer boundary surface 5 of the component part 1 to a second, preferably to the second outer boundary surface 5, which is located opposite the first outer boundary surface 5, according to the illustration in FIG. 3c.

In the case of a plurality of second regions 3, a combination of all above-mentioned designs of the second regions 3 is possible, provided that the shape and function of the component part 1 allows for this.

Figure 2:
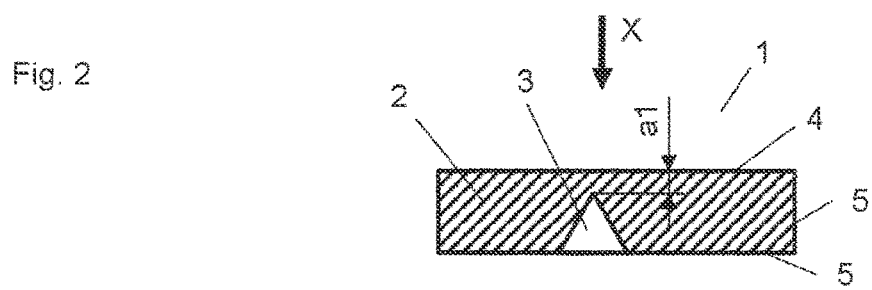
FIG. 2 shows an exemplary embodiment of a component part according to the invention comprising an exemplary functional surface and a second region.

Comparable to FIG. 1, FIG. 2 likewise shows a sectional illustration through a component part 1 according to the invention, in the case of which the second region 3 extends to the at least one boundary surface 5, of the component part 1 or of the first region 2, which differs from the at least one functional surface 4.

In the case of the example illustrated in FIG. 2, the first region 2 comprises only one second region 3, which is spaced apart with the distance a1 from the functional surface 4 and which has a triangular cross section in the sectional plane.

Although not illustrated in FIG. 2, it is also possible that the second region 3 is only minimally spaced apart from the functional surface 4 or essentially adjoins the latter.

Although not illustrated in FIG. 2, it is also possible that the first region 2 has a plurality of second regions 3. This plurality of the second regions 3 can extend either entirely to at least one boundary surface 5, or at least one second region 3 extends to an outer boundary surface 5, and at least one further second region 3 is completely enclosed by the first region 2.

A special case is illustrated in FIG. 2, in the case of which the at least one second region 3 extends to a boundary surface 5 of the component part 1 or of the first region 2, respectively, which is located opposite the least one functional surface 4.

FIGS. 3a to 3c each show a top view of the component part 1, which is illustrated in section in FIG. 2, although in each case in a different design.

Although only a sectional illustration of the component part 1 is illustrated in FIG. 2, at least one second region 3 or the one second region 3 can exclusively extend to the boundary surface 5, which is located opposite the functional surface 4 according to the illustration in FIG. 3a.

It is also possible that at least one second region 3 or the one second region 3 reaches to at least one boundary surface 5 according to the illustration in FIG. 3b.

It is further possible that at least one second region 3 or the one second region 3 reaches from a first outer boundary surface 5 of the component part 1 to a second outer boundary surface 5, which is preferably located opposite the first outer boundary surface 5 according to the illustration in FIG. 3c.

In the case of a plurality of second regions 3, a combination of all above-mentioned designs of the second regions 3 is possible, provided that the shape and function of the component part 1 allows for this.

Figure 4:
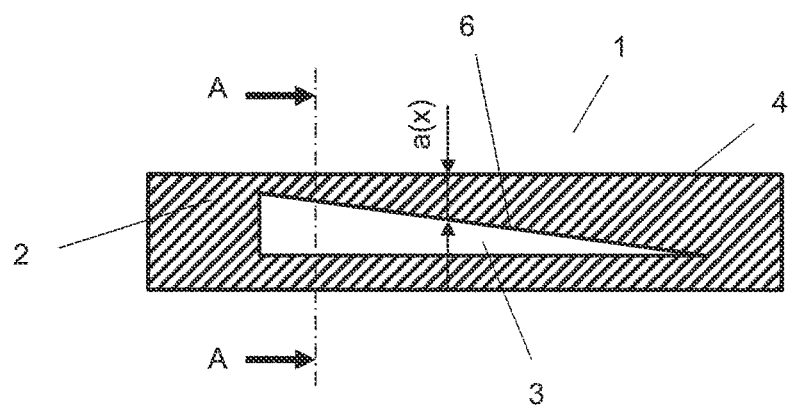
FIG. 4 shows a component part according to the invention in sectional illustration comprising a second region, which is formed over its extension with variable distance to the functional surface.

FIG. 4 shows a further embodiment of a component part 1 according to the invention, in the case of which the first region 2 comprises at least one second region 3, which, over its extension, forms an interface 6 facing the functional surface 4 between the at least one second region 3 and the first region 2, wherein this interface 6 has a variable distance a to the functional surface 4.

With advancing wear of the functional surface 4, an increasing portion of the second region 3 becomes part of the functional surface 4 in this respect, so that the level of wear can be determined based on the extent of the exposure of the at least one second region 3.

Figure 5:
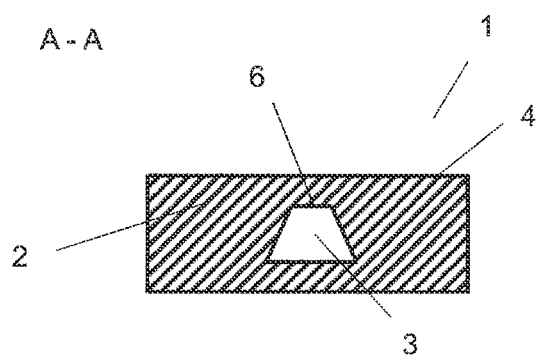
FIG. 5 shows a sectional illustration of the component part shown in FIG. 4.

Over its extension, this at least one second region 3 can either have a more or less even height in the extension of the distance a. As illustrated in FIG. 5, it is also possible, however, that the at least one second region 3 has a variable cross section in the sectional plane illustrated in FIG. 5.

It is further possible that, as a function of the distance a to the functional surface 4, at least one second region 3 has a variable cross section based on a sectional plane parallel to the functional surface 4, as illustrated in FIG. 5.

In particular in the case of second regions 3 with a slightly larger expansion in at least one dimension, as illustrated, for example, in FIG. 4, it is possible and advantageous when at least one of these second regions 3 consists of a material composition, which, as a function of the distance a or $a(x)$, respectively, to the functional surface 4, has different physical properties, in particular different optical properties, such as, for example, different colors.

Using the example illustrated in FIG. 4, this could be embodied, for example, in such a way that the left section of the second region 3 consists of a material, which is colored green or white, while the middle section of the second region 3 consists, for example, of material, which is colored yellow. The right section of the second region 3 can preferably be colored red or orange, so that in the case of a material of the first region 2, which is colored black, for example, the level of wear is recognizable without additional measuring means or aids based on the emergence of different colors, as already specified in the description of FIG. 1.

Although not illustrated in any of the FIGS. 1 to 5, at least one second region 3 can have physical properties, which can be detected, preferably detected in a contact-free manner, after the exposure of the at least one second region 3 as a result of wear of a functional surface 4.

This can take place, for example, in that the material of at least one second region 3 has a special optical reflection behavior, for example in a special frequency range of the visible light. It is also possible that the exposure of the second region 3, which consists of metallic material, can be captured by means of a capacitive sensor by the implementation of second regions 3 made of a metallic material in a first region 2 made of plastic.

With regard to the materials, which can be used for the first region 2 and for the second region 3 of the component part 1, there are generally no limitations. They can be made of the known metals and/or plastics.

In the case of conventional production of parts of this type, for example by attaching bores below and parallel to the wear surface, the bores can be filled with other materials, for example by inserting plastic or metal pins.

Although a production of a component part 1 according to the invention is possible with conventional production processes, a significantly higher flexibility and combinatorics exists for the design of the second regions 3 when using an additive production process, such as the 3D printing. A large variety of plastics and metals can further be processed and also combined with one another by means of this process, so that component parts 1 made of plastic and/or of metal can be produced therewith.

That which is claimed is:

1. A component part for use in printing presses or paper- and substrate-processing machines, wherein the component part comprises at least one first region made of a first material with first physical properties, and wherein the at least one first region comprises a functional surface, which is in contact with a web- or sheet-shaped substrate and which is subject to wear, and further wherein adjacent to and/or spaced apart from the functional surface, at least one second region is completely enclosed in the first region.

2. The component part according to claim 1, wherein the second region at least partially forms a part of the functional surface in the case of wear of the functional surface.

3. The component part according to claim 1, wherein the second region consists of a second material with second physical properties.

4. The component part according to claim 3, wherein the second physical properties are optical properties and/or a different reflection behavior.

5. The component part according to claim 1, wherein the second region defines a hollow space within the first region.

6. The component part according to claim 1, wherein the at least one second region extends to at least one boundary surface of the component part, which differs from the functional surface.

7. The component part according to claim 1, wherein the at least one second region extends to a boundary surface of the component part, which is located opposite the functional surface.

8. The component part according to claim 1, wherein the at least one first region comprises a plurality of second regions, wherein at least two of the plurality of second regions have a different distance to the functional surface.

9. The component part according to claim 1, wherein the at least one second region has, over its extension to the functional surface, a variable distance to the functional surface with an interface facing the functional surface.

10. The component part according to claim 1, wherein as a function of the distance to the functional surface, the at least one second region has a variable cross section based on a sectional plane parallel to the functional surface.

11. The component part according to claim 1, wherein the at least one second region consists of a material composition, which, as a function of the distance to the functional surface, has different physical properties, in particular different optical properties.

12. The component part according to claim 1, wherein the at least one second region has physical properties, which can be detected after an exposure of the second region as a result of wear of the functional surface.

13. The component part according to claim 12, wherein the at least one second region can be detected in a contact-free manner after the exposure.

14. The component part according to claim 1, wherein the component part is produced by means of a 3D printing process.

15. A component part for use in printing presses or paper- and substrate-processing machines, wherein the component part comprises at least one first region made of a first material with first physical properties, and wherein the at least one first region comprises a functional surface, which is in contact with a web- or sheet-shaped substrate and which is subject to wear, and further wherein adjacent to and/or spaced apart from the functional surface, at least one second region is at least partially enclosed by the first region and defines a hollow space within the first region.

16. A component part for use in printing presses or paper- and substrate-processing machines, wherein the component part comprises at least one first region made of a first material with first physical properties, and wherein the at least one first region comprises a functional surface, which is in contact with a web- or sheet-shaped substrate and which is subject to wear, and further wherein adjacent to and/or spaced apart from the functional surface, at least one second region is at least partially enclosed by the first region and extends to a boundary surface of the component part, which is located opposite the functional surface.

* * * * *